Sept. 17, 1935. G. Z. GREENE 2,014,682
ORIFICE METER FITTING
Filed Sept. 18, 1931 2 Sheets-Sheet 1

Inventor
Gordon Z. Greene
By
His Attorney

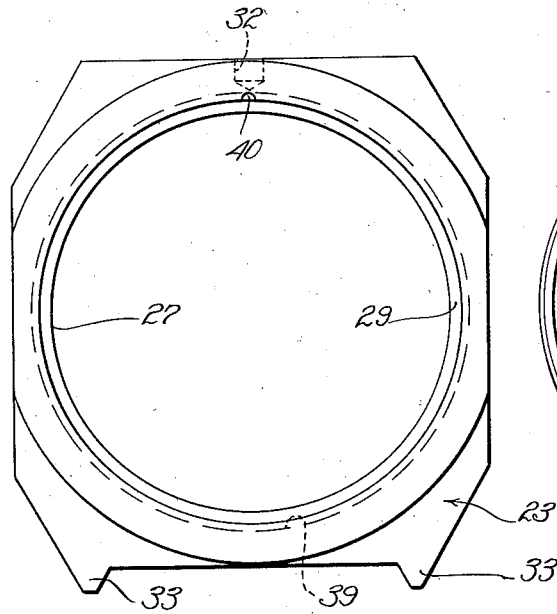
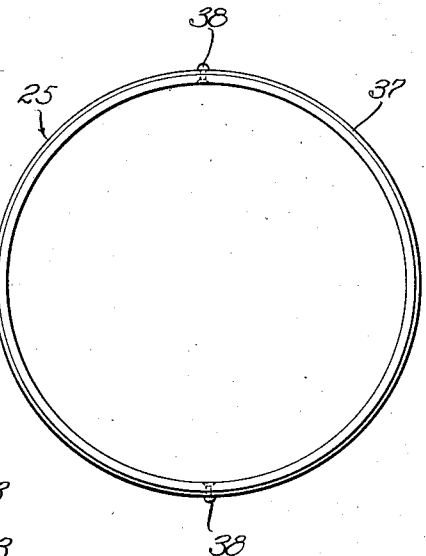
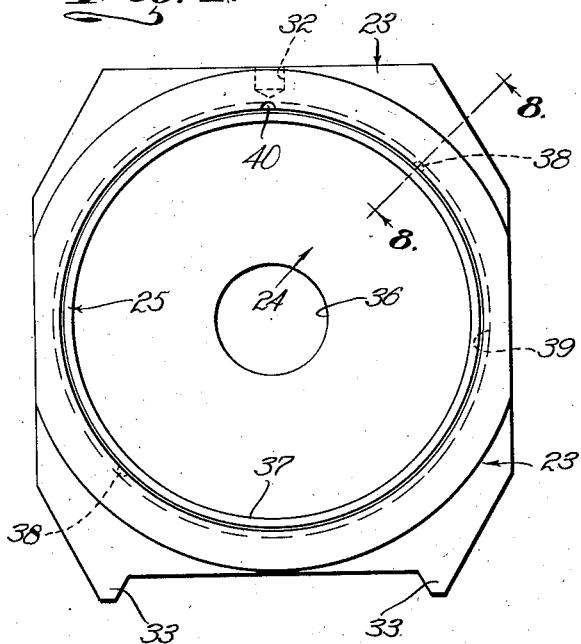
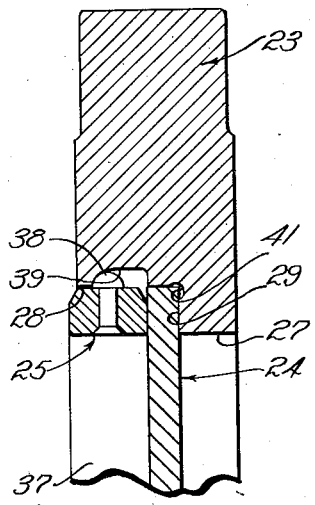

Patented Sept. 17, 1935

2,014,682

UNITED STATES PATENT OFFICE 2,014,682

ORIFICE METER FITTING

Gordon Z. Greene, Pasadena, Calif.

Application September 18, 1931, Serial No. 563,542

11 Claims. (Cl. 137—75)

This invention has to do with an orifice meter fitting, and has particular reference to the mounting and seating of the orifice disc of an orifice meter fitting. It is a general object of the present invention to provide a simple, practical, and improved construction for removably mounting and holding an orifice disc in operative position across the fluid passage of an orifice meter fitting.

An object of the invention is to provide an orifice meter fitting in which the removable orifice disc is removably clamped in effective sealing engagement with its carrier and with the walls of the body of the fitting when in the operative position.

Another object of the invention is to provide an orifice meter fitting in which the disc may be easily and quickly positioned in and removed from its operative position across the fluid passage.

Another object of the invention is to provide an orifice meter fitting construction in which the orifice disc is detachably held in the shiftable disc carrier by a single part in the form of a simple ring. The disc-retaining ring embodied in the present invention is adapted to removably retain the orifice disc in position to seal with the carrier and is operatable to form an effective fluid tight seal between the disc and the body of the fitting.

It is another object of the invention to provide an orifice meter fitting construction of the character mentioned in which effective fluid seals are provided between the orifice disc and carrier and between the orifice disc and housing without the use of expansible or wedge parts and without the use of packing, etc.

A further object of the invention is to provide a construction for removably mounting and seating an orifice disc that is simple and inexpensive of manufacture and that may be readily embodied in various types and classes of orifice meter fittings, and the like.

Figure 1:
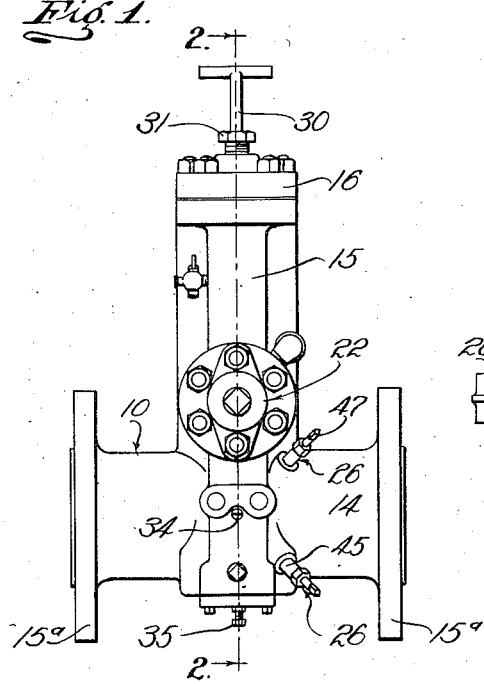
Figure 2:
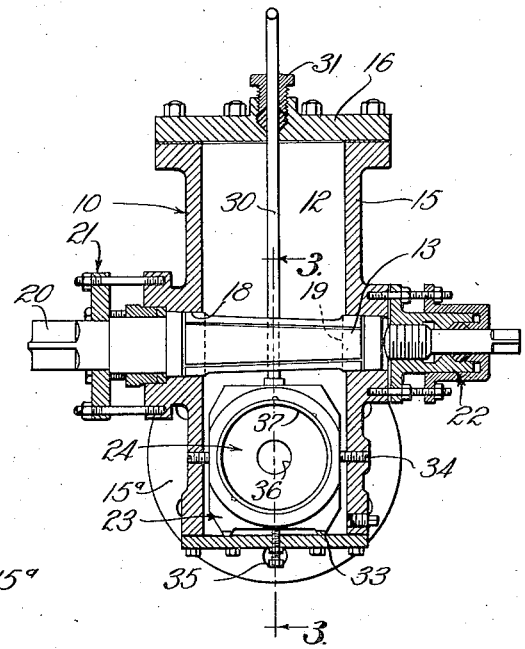
Figure 3:
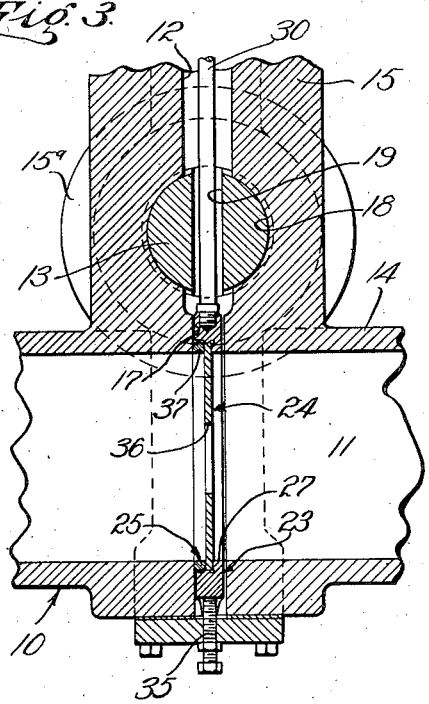
Figure 4:
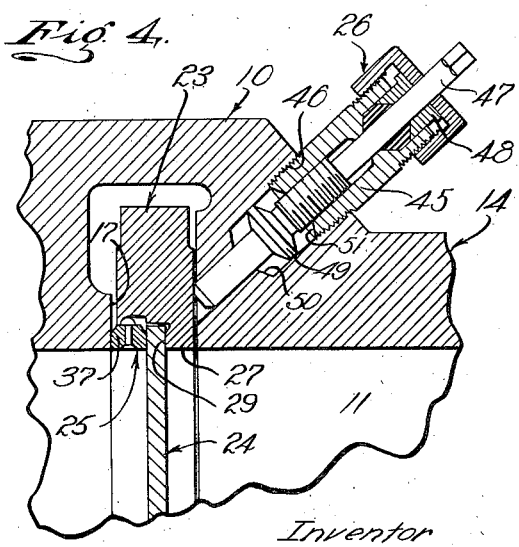

Other objects and features of the invention will be best and more fully understood from the following detailed description of a typical form and application of the invention, throughout which description reference will be had to the accompanying drawings, in which:

Fig. 1 is a side elevation of an orifice meter fitting embodying the features of the present invention. Fig. 2 is a vertical detailed sectional view of the fitting, being a view taken as indicated by line 2—2 on Fig. 1. Fig. 3 is an enlarged vertical or transverse sectional view of the lower portion of the fitting, being a view taken as indicated by line 3—3 on Fig. 2. Fig. 4 is an enlarged fragmentary sectional view illustrating the carrier and disc-retaining means and one of the clamping units embodied in the invention. Fig. 5 is an enlarged face or end elevation of the disc carrier. Fig. 6 is an enlarged end view of the disc-retaining ring. Fig. 7 is an end elevation of the assembly of the carrier, orifice disc, and retaining ring, and Fig. 8 is an enlarged detailed sectional view of the assembly, being a view taken as indicated by line 8—8 on Fig. 7.

The means or construction provided by the present invention for removably retaining and for sealing about an orifice disc may be employed in connection with or embodied in orifice meter fittings of various types and classes. Throughout the following detailed disclosure the invention will be described as embodied in the more or less typical form of orifice meter fitting illustrated in the drawings, it being understood that the invention is not to be taken as limited or restricted to the specific form or application about to be described, but that it is to be taken as including any features or modifications that may fall within the scope of the claims.

The general orifice meter construction illustrated in the drawings includes, generally, a housing or body 10 having a fluid passage 11 and a chamber 12 intersecting the fluid passage, a plug 13 for sealing between the fluid passage 11 and the principal parts of the chamber 12, and various other parts common to devices of this character.

The body 10 has a lower portion 14 that is cylindrical in its general configuration and that is provided with the longitudinal fluid passage 11. Flanges 15a are provided at the opposite ends of the body part 14 to facilitate connection of the fitting in a pipe line. The chamber 12 is provided in a projecting neck 15 of the body. The neck 15 is shown integral with the body and projects laterally or upwardly from the body portion 14. The neck 15 and its chamber 12 are substantially rectangular in horizontal cross section, and the upper end of the chamber is closed by a removable head or cover plate 16.

The chamber 12 is provided to carry and pass the orifice disc carrier, and its lower end communicates with or intersects the fluid passage 11. The lower end portion of the chamber 12 at the fluid passage 11 is of reduced width, as illustrated in Fig. 3 of the drawings, and has spaced parallel side walls. An annular seat 17 is provided on one wall of the chamber 12 around the fluid passage 11. The seat 17 is flat and regular, being in the nature of a sealing face, and completely surrounds the fluid passage 11.

The plug 13 is operatable to close off or seal off the upper portion of the chamber 12 from the fluid passage 11. The plug 13 is rotatable in a transverse horizontal opening 18 intersecting the chamber 12 at a point above the fluid passage 11. The opening 18 is of sufficient diameter to have opposite wall parts at the opposite sides of the chamber 12, as clearly illustrated in Fig. 3 of the drawings. The closing plug 13 and the opening 18 are longitudinally tapered to provide for the effective sealing of the plug with the walls of the opening. A transverse opening or slot 19 is provided in the plug 13 to pass the orifice disc carrier, as will be subsequently described. The plug 13 is rotatable between a position where the opposite ends of the slot 19 are closed by the walls of the opening 18 and a position where the slot 19 is in vertical central alignment with the chamber 12 to permit the passage of the disc carrier through the plug. The large end of the plug 13 projects horizontally from the neck 15 and has a polygonal portion 20 to facilitate its operation. Suitable means 21 is provided at the large end of the plug 13 to hold it in sealing engagement with the walls of the opening 18 and to prevent the leakage of fluid from around the plug. Suitable packing means and back-off means 22 is provided at the small end of the plug 13.

The present invention is concerned primarily with the orifice disc for arrangement across the fluid passage 11, with the carrier for the orifice disc, and with the means for holding the disc in operative position across the fluid passage and for sealing about the disc when in the operative position. The construction provided by the invention includes, generally, a carrier 23 movable between a position at the fluid passage 11 and a position in the upper end of the chamber 12, an orifice plate or disc 24, means 25 for removably holding the disc 24 in the carrier 23, and means 26 for clamping against the carrier 23 to provide for a fluid tight seal between the disc 24 and the carrier 23 and for a fluid tight seal between the disc 23 and for a fluid seal between the disc 24 and the body 10.

The carrier 23 is provided to hold and support the orifice disc 24. The carrier 23 is substantially rectangular in side elevation and is proportioned to have free movement vertically through the chamber 12. A central opening 27 is provided in the carrier 23 to register with the fluid passage 11 when the parts are in their normal positions and to carry the orifice disc 24. The opening 27 is round to correspond with the configuration of the fluid passage 11 and is enlarged on one side to form a recess 28. An annular axially-facing shoulder 29 occurs between the end portion of the opening 27 and the recessed end portion 28. The shoulder 29 is in the nature of a sealing face for cooperating with or receiving the orifice disc 24 as will be hereinafter described, and is preferably flat and regular.

In accordance with the broader aspects of the invention, the carrier 23 may be operated through the chamber 12 in any suitable manner. In the particular case illustrated in the drawings, a manually-operatable rod or stem 30 is provided for shifting the carrier 23. The stem 30 extends vertically through a packing gland 31 in the cap 16 to project into the chamber 12. The lower end of the stem 30 is screw threaded so that it may be threaded into a socket 32 in the upper end of the carrier 23. During normal use or operation of the fitting, the stem 30 is disconnected from the carrier 23 and has its lower end disposed within the upper portion of the chamber 12 so that the plug 13 may be in the closed position where it seals off the upper end of the chamber from the fluid passage 11. When it is desired to shift the carrier 23 to replace the orifice disc, the plug 13 is turned until the slot 19 is vertical so that the end of the stem 30 may be threaded into the socket 32 and the carrier 23 then be pulled upwardly through the slot into the upper end of the chamber 12.

Means are provided for properly centering the carrier 23 in the lower end of the chamber 12 so that its opening 27 is co-axial with the fluid passage 11. Spaced feet 33 are provided on the lower end of the carrier 23 to engage the lower end of the chamber 12. Guide screws 34, or the like, are provided on the side walls of the chamber 12 to slidably engage the side edges of the carrier 23. The feet 33 and the guide members 34 are adapted to maintain the carrier 23 in a position where its opening 27 is in true register with the fluid passage 11. A screw 35 may be provided to engage the lower end of the carrier 23 and break it loose from its normal position in the event that it becomes set or immovable.

The orifice plate or disc 24 is adapted to be supported by the carrier 23 to extend across the fluid passage 11 and cause a differential in fluid on the fluid at opposite sides of the disc. The orifice disc 24 is proportioned to extend into the enlarged portion 28 of the opening in the carrier and to seat against the shoulder 29. The opposite sides of the orifice disc 24 are preferably flat and parallel, as illustrated in the drawings. A central opening 36 of the desired size is provided in the disc 24.

The means 25 for removably or detachably holding the disc 24 in the carrier 23 comprises a single retaining and sealing ring 37. The ring 37 is adapted to fit in the enlarged portion 28 of the opening in the carrier to engage a side of the orifice disc 24. In accordance with the preferred form of the invention, the opposite sides of the ring 37 are flat and normal to the axis of the ring and are in the nature of sealing faces. The internal diameter of the sealing and retaining ring 37 is preferably the same as that of the fluid passage 11. The ring 37 is proportioned and shaped to readily fit into the enlarged part 28 of the carrier opening and to project from the side of the carrier 23 when in the retaining position against the disc 24. Both of the outer corners of the ring 37 are beveled to facilitate the arrangement of the ring in the opening 28.

The invention includes means for releasably holding the ring 37 in its retaining position. Projections or lugs 38 project from the periphery of the retaining ring 37 at diametrically opposite points. The lugs 38 may be in the nature of the heads of rivets passed through radial openings in the ring 37, as illustrated throughout the drawings. In the preferred construction, the lugs 38 are rounded or substantially semi-spherical. The enlarged portion 28 of the carrier opening is under cut or provided with an annular groove 39 to receive the lugs 38. A notch or notches 40 are provided in the carrier 23 to pass a lug or lugs 38 into the groove 39. In the embodiment of the invention illustrated throughout the drawings, a single notch 40 is provided in the carrier 23 at the upper end of the opening 28.

To position the ring 37 in its retaining position, it is first arranged with its lower portion in the lower part of the opening 28 so that one of the lugs 38 extends into the groove 39. The ring 37 may then be tilted toward the carrier 23 so that the other lug 38 is passed through the notch 40 into the groove 39. A partial turn or rotation of the ring 37 to move the uppermost lug 38 out of register with the notch 40 locks the ring 37 in the carrier. It is an important feature of the invention that the lug-receiving groove 39 is of sufficient axial length to allow for axial movement of the ring 37, so that the end of the ring may effectively seat against the orifice disc 24 to seal with the disc and hold the disc against the shoulder 29. In the particular case illustrated in the drawings, the groove 39 extends axially inward to a point approximately at the outer edge of the disc 24. The lugs 38 are equally spaced between the opposite ends of the ring 37 so that the ring 37 may be arranged with either of its ends toward or against the orice disc 24. It is to be understood that the orifice disc 24 is to be arranged in the carrier 23 and that the ring 37 is to be assembled in its retaining position when the carrier 23 is at the exterior of the fitting body 10. An axial groove 41 is provided at the outer edge of the shoulder 29. The groove 41 and the beveled corner of the ring 37 are adapted to receive any burrs or irregularities on the outer corner of the disc 24 to permit the effective sealing engagement of the plate 24 with the shoulder 29 and the ring 37 with the plate.

The means 26 is provided to act on or clamp against an end of the carrier 23 to force and clamp the retaining and sealing ring 37 against the seat 17 and, accordingly, to clamp the peripheral edge portions of the orifice disc 24 between the sealing shoulder 29 and the ring 37. The means 26 is in the nature of a screw means and includes a plurality of like clamping units provided at circumferentially spaced points on the cylindrical portion 14 of the body. The several clamping units are alike, and each includes a tubular plug 45 screw threaded into an opening 46 in the body part 14, and a clamping screw 47 threaded through the plug. The openings 46 are inclined at suitable angles to the vertical and horizontal, and each has an inner portion of reduced diameter communicating with the chamber 12. The plugs 45 are screw threaded into the outer portions of the openings 46 and project outwardly from the body part 14.

The clamping screws 47 are threaded through the plugs 45 and extend through the openings 46 to project into the chamber 12 and engage a side of the carrier 23. The outer ends of the clamping screws 47 project from the plugs 45 and are polygonal to facilitate the turning of the screws. Suitable packing glands 48 are provided on the outer ends of the plugs 45 to seal about the clamping screws 47. Each screw 47 is provided with a sealing collar 49 which is adapted to either cooperate with a sealing shoulder 50 in the opening 46 or a sealing face 51 on the inner end of the plug 45. The sealing collars 49 of the screws 47 may be brought into engagement with either the shoulders 50 or the faces 51 to provide a seal between the clamping screws and the plugs during shifting of the carrier 23 and/or during repacking of the glands 48. The screws 47 are adapted to be threaded against the carrier 23 to force the ring 37 against the seat 17 and thus clamp the disc 24 between the shoulder 29 and the ring 37. The screws 47 are adapted to exert a suitable pressure on the carrier 23 to provide for the effective sealing engagement of the disc 24 with the shoulder 29 and of the ring 37 with the disc and the seat 17. It will be apparent that the screws 37 may be threaded outwardly to disengage from the carrier 23 and permit the carrier 23 to be operated upwardly through the chamber 12.

It is believed that the utility and practicability of the construction provided by the present invention will be readily apparent from the foregoing detailed description. The orifice disc 24 may be easily positioned in the opening of the carrier 23, and the retaining and sealing ring 37 is readily arranged in its retaining position. The ring 37 operates to hold the orifice disc 24 in the carrier 23 during the operation of the carrier through the chamber 12. After the carrier 23 has been lowered through the chamber 12 to its operative position at the fluid passage 11, the stem 30 may be threaded out of the socket 32 and drawn upwardly so that the plug 13 may be operated to the closed position. When the carrier 23 has been properly set in the lower end of the chamber 12, the clamping screws 47 may be threaded inwardly to clamp against the side of the carrier 23. The clamping of the screws 47 against the carrier brings the outer end of the ring 37 into sealing engagement with the seat 17 and clamps the orifice disc 24 between the ring and the shoulder 29. As the opposite ends of the ring 37 are in the nature of sealing faces, the ring is adapted to form an effective fluid tight seal between the shoulder 17 and the disc 24. The clearance of the lugs 38 in the groove 39 allows the sealing and retaining ring 37 to properly center itself and seal with the seat 17 and the disc 24. The ring 37 cooperates with the seat 17 to prevent the leakage of the fluid between the carrier 23 and the walls of the chamber 12, while the plate 24 is tightly clamped between the sealing shoulder 29 and the ring 37, so that leakage of fluid around the plate is prevented. It is to be noted that the present invention provides an orifice meter fitting construction wherein a single simple ring operates to releasably hold the orifice plate or disc in position in the carrier and also operates to provide a fluid seal between the orifice disc and the seat in the body of the fitting. The ring 37 may be easily and quickly arranged in and detached from the carrier and does not involve any packing or screw threads.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. In an orifice meter fitting, a body having a fluid passage, a seat in the body around the passage, a carrier in the body, a disc supported by the carrier to extend across the passage, a removable member retaining the plate in the carrier and adapted to seal with both the seat and the disc, and means acting through the carrier for clamping the member against the seat and for clamping the disc against the member.

2. A device of the character described including, a body having a fluid passage and a chamber intersecting the passage, a seat in the body around the passage, a shiftable carrier in the chamber having an opening to register with the passage, an axially facing shoulder in the opening, a disc in the opening adapted to seal against the shoulder, a ring having limited play in the opening and adapted to seal with both the seat and disc, and means for clamping the ring and disc togethehr between the seat and shoulder.

3. A device of the character described including, a body having a fluid passage and a chamber intersecting the passage, a seat in the body around the passage, a shiftable carrier in the chamber having an opening to register with the passage, an axially facing shoulder in the opening, a plate in the opening adapted to seal against the shoulder, a removable retaining ring in the opening adapted to have axial play in the opening so as to bear against the plate, and means for clamping the ring and plate together between the seat and shoulder to form a fluid-tight seal between the seat and shoulder.

4. A device of the character described including, a body having a fluid passage and a chamber intersecting the passage, a seat on a wall of the chamber around the passage, a carrier movable in the chamber between a position at the passage and a position removed from the passage, the carrier having an opening adapted to register with the passage, a sealing shoulder in the opening facing the seat, a removable plate in the opening having sealing faces on its opposite sides, one of said faces being adapted to cooperate with the shoulder, and a sealing ring releasably retaining the plate in the opening for sealing with the other face of the plate and projecting from the carrier to seal with the said seat.

5. A device of the character described including, a body having a fluid passage and a chamber intersecting the passage, a seat on a wall of the chamber around the passage, a carrier movable in the chamber between a position at the passage, and a position removed from the passage, the carrier having an opening adapted to register with the passage, a sealing shoulder in the opening facing the seat, a removable plate in the opening having sealing faces on its opposite sides, one of said faces being adapted to cooperate with the shoulder, a sealing ring in the opening for sealing with the other face of the plate and projecting from the carrier to seal with the seat, and a releasable lug and slot connection between the sealing ring and the carrier whereby the sealing ring detachably retains the plate in the opening but is free to be forced inward against the plate.

6. A device of the character described including, a body having a fluid passage and a chamber intersecting the passage, a seat in the body around the passage, a shiftable carrier in the chamber having an opening to register with the passage, an axially facing shoulder in the opening, a plate in the opening adapted to seal against the shoulder, a sealing ring removably holding the plate in the opening and projecting from the carrier toward the seat, a lug and slot connection between the ring and carrier holding the ring against outward movement in the opening and allowing inward movement of the ring and a plurality of spaced screws on the body for urging the carrier toward the seat to clamp the ring against the seat and to clamp the plate between the ring and shoulder.

7. In a device of the character described, a shiftable carrier having an opening, an axially facing shoulder in the opening, a removable orifice plate in the opening adapted to seal against said shoulder, a removable ring in the opening for retaining the plate in the opening, the ring projecting from the carrier, and releasable means holding the ring against outward movement, the ring being free to move inwardly whereby it may seal against the plate.

8. A device of the character described including, a body having a fluid passage and a chamber intersecting the passage, a seat in the body around the passage, a shiftable carrier in the chamber having an opening to register with the passage, an axially facing shoulder in the opening, a plate in the opening adapted to seal against the shoulder, a removable ring retaining the plate in the opening and projecting from the carrier toward the seat, means releasably holding the ring against outward movement, the ring being free to move inwardly to seal against the plate, and means on the body releasably clamping the ring and plate together between the seat and shoulder.

9. A device of the character described including, a body having a fluid passage and a chamber intersecting the passage, a seat in the body around the passage, a shiftable carrier in the chamber having an opening to register with the passage, an axially facing shoulder in the opening, a plate in the opening adapted to seal against the shoulder, a sealing ring removably holding the plate in the opening and projecting from the carrier toward the seat, means releasably holding the ring against outward movement, the ring being free to move inwardly to seal against the plate, and a screw on the body for urging the carrier toward the seat to clamp the ring against the seat and to clamp the plate between the ring and shoulder.

10. In a device of the character described, a shiftable carrier having an opening, an axially facing shoulder in the opening, a removable orifice plate in the opening adapted to seal against said shoulder, a ring in the opening removably mounted upon the carrier and serving to normally retain the plate in the opening but upon removal of the ring enabling the plate to be removed, said ring being so mounted upon the carrier as to enable its being forced axially against the plate upon the application of axial pressure to force the plate against the shoulder to effect a seal.

11. In a device of the character described, a shiftable carrier having an opening, an axially facing shoulder in the opening, a removable orifice plate in the opening adapted to seal against said shoulder, and means detachably mounted upon the carrier for retaining the plate in the opening, said means being axially movable without rotation when in plate retaining position whereby upon the application of axial pressure said means may be forced axially against the plate and force the plate against the shoulder to effect a seal, said means when in plate retaining position projecting outwardly beyond the face of the carrier.

GORDON Z. GREENE.